(12) United States Patent
Kurokawa et al.

(10) Patent No.: US 8,400,428 B2
(45) Date of Patent: Mar. 19, 2013

(54) TOUCH PANEL AND METHOD FOR DRIVING THE SAME

(75) Inventors: Yoshiyuki Kurokawa, Kanagawa (JP); Takayuki Ikeda, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 749 days.

(21) Appl. No.: 12/569,400

(22) Filed: Sep. 29, 2009

(65) Prior Publication Data

US 2010/0085331 A1     Apr. 8, 2010

(30) Foreign Application Priority Data

Oct. 2, 2008   (JP) .................................. 2008-257767

(51) Int. Cl.
   *G06F 3/042*     (2006.01)
(52) U.S. Cl. .......................... 345/175; 345/102; 345/207
(58) Field of Classification Search .................. None
   See application file for complete search history.

(56) References Cited

U.S. PATENT DOCUMENTS

| 5,873,070 | A | * | 2/1999 | Bunte et al. ..................... 705/28 |
| 6,747,290 | B2 | | 6/2004 | Yamazaki et al. |
| 6,747,638 | B2 | | 6/2004 | Yamazaki et al. |
| 7,068,254 | B2 | | 6/2006 | Yamazaki et al. |
| 7,365,750 | B2 | | 4/2008 | Yamazaki et al. |
| 7,369,114 | B2 | * | 5/2008 | Arakawa ....................... 345/102 |
| 7,525,523 | B2 | | 4/2009 | Yamazaki et al. |
| 7,570,246 | B2 | * | 8/2009 | Maniam et al. ................ 345/102 |
| 2002/0011972 | A1 | * | 1/2002 | Yamazaki et al. ........... 345/74.1 |
| 2005/0030264 | A1 | * | 2/2005 | Tsuge et al. .................... 345/76 |
| 2006/0256093 | A1 | | 11/2006 | Furukawa et al. |
| 2009/0003699 | A1 | * | 1/2009 | Dugan et al. .................. 382/173 |
| 2009/0141004 | A1 | | 6/2009 | Yamazaki |
| 2009/0321751 | A1 | * | 12/2009 | Miyao et al. ..................... 257/84 |
| 2010/0090996 | A1 | * | 4/2010 | Chou et al. .................... 345/207 |

FOREIGN PATENT DOCUMENTS

| EP | 1 154 383 A2 | 11/2001 |
| JP | 2001-292276 | 10/2001 |
| JP | 2002-033823 | 1/2002 |
| JP | 2002-287900 | 10/2002 |
| JP | 2006-317682 | 11/2006 |
| JP | 2007-183706 | 7/2007 |

* cited by examiner

*Primary Examiner* — Van Chow
(74) *Attorney, Agent, or Firm* — Nixon Peabody LLP; Jeffrey L. Costellia

(57) ABSTRACT

A touch panel having high reading accuracy of an object to be detected is provided. In a method for driving a touch panel which is provided with a photo sensor in a pixel, an image is displayed in a display portion of a touch panel, a detection region is determined by detecting approach or contact of an object to be detected in a state in which the image is displayed, and the object to be detected is read while substantially equalizing the intensity of light of pixels in the detection region per unit time and unit area. The intensity of light of the pixels per unit time and unit area, which is to be substantially equal, is preferably the maximum intensity of light in the detection region before adjustment, more preferably, the intensity of light for white display.

30 Claims, 7 Drawing Sheets

TOUCH PANEL AND METHOD FOR DRIVING THE SAME

BACKGROUND OF THE INVENTION

1. Field of the Invention

The present invention relates to a touch panel which is formed using a touch sensor and a method for driving the touch panel. In particular, the present invention relates to a touch panel in which pixels provided with touch sensors are arranged in matrix and a method for driving the touch panel. Further, the present invention relates to a semiconductor device and an electronic device including the touch sensor.

2. Description of the Related Art

In recent years, a display device provided with a touch sensor has attracted attention. The display device provided with a touch sensor is called a touch panel, a touch screen, or the like (hereinafter referred to as a touch panel). Examples of the touch sensor include a resistive touch sensor and a capacitive touch sensor, which are different in operation principle. In both kinds of sensors, data can be input by contact of an object to be detected with a display portion of a display device, or the like.

As one of such touch sensors, an optical touch sensor is given. In an optical touch panel, a touch sensor which detects light is provided, and a display screen also serves as an input region. As an example of a device including such an optical touch sensor, a display device having an image capturing function, which is provided with a contact area sensor which captures an image, is given (for example, Patent Document 1). In the optical touch panel, light is emitted from the touch panel. In the case where an object to be detected exists at a given position of the touch panel, light at the region where the object to be detected exists is blocked by the object to be detected, and part of light is reflected. A photo sensor (also referred to as a photoelectric conversion element) which can detect light is provided in a pixel of the touch panel, and the photo sensor detects the reflected light, so that existence of the object to be detected in the region can be recognized.

In addition, it has been attempted to give a personal authentication function or the like to an electronic device typified by a portable information terminal such as a mobile phone (for example, Patent Document 2). A finger print, a face, a hand print, a palm print, a pattern of a hand vein, and the like are used for personal authentication. In the case where a portion different from the display portion has a personal authentication function, the number of components is increased, and the weight or price of the electronic device could possibly be increased. Patent Document 3 discloses a technique by which a fingertip is detected in accordance with the brightness of outside light.

REFERENCE

[Patent Document]
[Patent Document 1] Japanese Published Patent Application No. 2001-292276
[Patent Document 2] Japanese Published Patent Application No. 2002-033823
[Patent Document 3] Japanese Published Patent Application No. 2007-183706

SUMMARY OF THE INVENTION

In a conventional case, for example, when an optical touch sensor (photo sensor) is provided in a touch panel capable of color display, non-uniformity is caused in the hue of light which is reflected by an object to be detected; therefore, it was difficult to accurately read the object to be detected. Such non-uniformity in the hue of light depends on a displayed image.

One means to solve the above problem is to increase the integration degree of touch sensors. However, when the integration degree of the touch sensors is increased, an aperture ratio of a display device is lowered, which leads to deterioration in display quality. That is, there is a trade-off between the integration degree of the touch sensors and the aperture ratio of the display device.

Therefore, it is an object of one embodiment of the present invention to provide a touch panel which can read an object to be detected with high accuracy without increasing the integration degree of touch sensors (i.e., without reducing the aperture ratio of the display device).

In view of the above problem, one embodiment of the present invention provides a touch panel which reduces non-uniformity in the hue depending on a displayed image and has high accuracy in reading an object to be detected, and a driving method thereof. Specifically, a detection region for an object to be detected on a touch panel is defined, and light emitted from the detection region is set to be uniform. In one embodiment of the present invention, in a touch panel provided with a photo sensor in a pixel, an image is displayed in a display device, a detection region is determined by detecting approach or contact of an object to be detected in a state in which the image is displayed, and the object to be detected is read while equalizing gray scale levels of pixels in the detection region. Here, it is preferable to equalize gray scale levels of the pixels provided in the detection region to a gray scale level of the brightest pixel among the pixels provided in the detection region. More preferably, the gray scale levels of the pixels are highlight, that is, white display is performed. By white display, the intensity of light which is emitted to the object to be detected can have the maximum value.

In such a manner, by equalizing the gray scale levels of the pixels, the intensity of light emitted from the pixels to the object to be detected per unit area and unit time can be substantially the same.

In order to equalize the gray scale levels of the pixels, a video signal may be controlled. By equalizing video signals for the pixels provided in the detection region, the gray scale levels of the pixels can be equal to each other.

Therefore, another embodiment of the present invention is a method for driving a touch panel which is provided with a photo sensor in a pixel; in the method, an image is displayed in a display device, a detection region is determined by detecting approach or contact of an object to be detected in a state in which the image is displayed, and the object to be detected is read while substantially equalizing video signals for pixels in the detection region.

Still another embodiment of the present invention is a method for driving a touch panel which is provided with a photo sensor in a pixel; in the method, an image is displayed in a display device, a detection region is determined by detecting approach or contact of an object to be detected in a state in which the image is displayed, and the object to be detected is read while equalizing video signals for pixels in the detection region to a video signal for the brightest pixel among the pixels provided in the detection region.

Still another embodiment of the present invention is a method for driving a touch panel which is provided with a photo sensor in a pixel; in the method, an image is displayed in a display device, a detection region is determined by detecting approach or contact of an object to be detected in a state in which the image is displayed, and the object to be detected is read while equalizing video signals for pixels in the detection region to a signal at the time of highlight (a signal for white display). When the intensity of light in the pixels per unit area and unit time has the maximum value, display in the detection region is generally white.

Still another embodiment of the present invention is a touch panel which is driven by a driving method with the above structure.

In a touch panel with the above structure, arrangement of colors of the pixels is preferably delta arrangement. By employing delta arrangement for the pixels, non-uniformity in the hue can be reduced.

As for the touch panel with the above structure, the display device provided for the touch panel is preferably a liquid crystal display device. When the touch panel with the above structure is formed using a light-emitting device, the power consumption is increased in the case where gray scale levels of pixels in the detection region are equalized to the gray scale level of the brightest pixel among the pixels provided in the detection region. On the other hand, by forming the touch panel using a liquid crystal display device, since the intensity of light emitted from the detection region can be uniform by only changing the alignment of liquid crystal molecules, the power consumption of a backlight is not increased.

In the touch panel with the above structure, the intensity of light emitted from the pixels is preferably substantially uniform at the time of highlight of the liquid crystal display device. More preferably, as a backlight of the liquid crystal display device, a cold-cathode fluorescent lamp (CCFL) or a white light-emitting diode (LED) is used. By using a cold-cathode fluorescent lamp or a white light-emitting diode as a backlight of the liquid crystal display device, the intensity of light emitted from the detection region can be uniform without increasing the power consumption of the backlight.

Note that in a display portion of a touch panel which is one embodiment of the present invention, pixels are arranged in matrix, and each pixel is provided with a thin film transistor. A scan line is connected to a gate of the thin film transistor, and a signal line is connected to a source thereof.

Even with a touch panel provided with a photo sensor in a pixel, high-sensitivity detection can be achieved.

The above structure enables a touch panel which can perform high-sensitivity detection to be achieved and spatial resolution to be improved, thereby improving reading accuracy of an object to be detected. Further, since the aperture ratio is not reduced, the reading accuracy of the touch panel can be improved without lowering display quality.

Accordingly, the object to be detected can be read accurately in detail. Therefore, finger print authentication or the like can be conducted on the touch panel, and the object to be detected can be identified without providing other equipment.

DETAILED DESCRIPTION OF THE INVENTION

Figure 1:
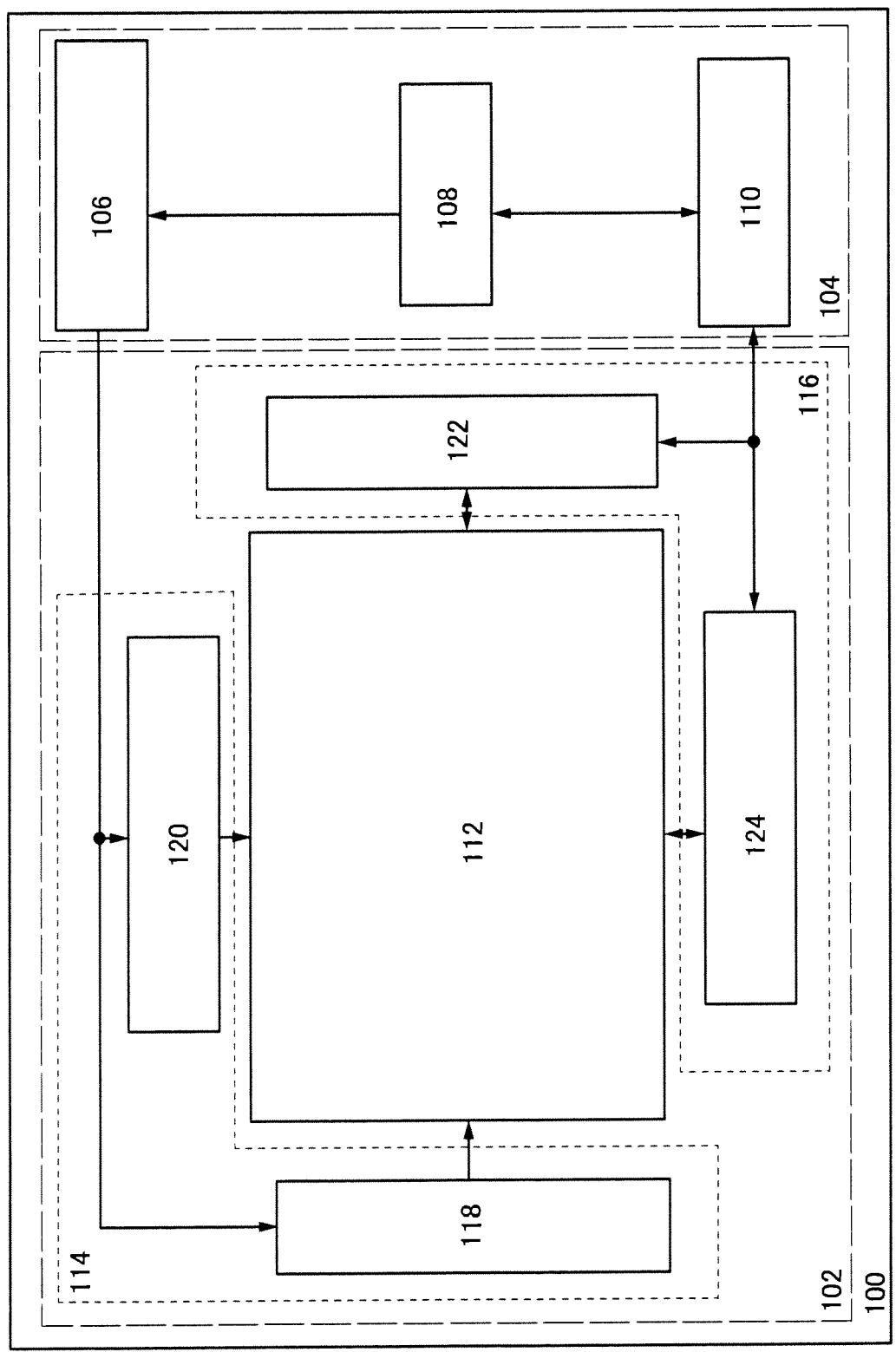
FIG. 1 is a block diagram of a touch panel.

Hereinafter, an embodiment of the present invention will be described in detail with reference to the accompanying drawings. The present invention is not limited to the following description, and it is easily understood by those skilled in the art that modes and details disclosed herein can be modified in various ways without departing from the spirit and the scope of the present invention. Therefore, the present invention should not be interpreted as being limited to the description of the embodiment below. Note that identical portions are denoted by the same reference numerals throughout the drawings for describing the structure of the present invention. The same hatching pattern is applied to similar parts, and the similar parts are not especially denoted by reference numerals in some cases.

[Embodiment]

Hereinafter, a touch panel which is one embodiment of the present invention and a driving method thereof will be described.

FIG. 1 is a block diagram illustrating an example of the structure of the touch panel which is one embodiment of the present invention. A touch panel 100 illustrated in FIG. 1 includes a display portion 102 and an arithmetic control circuit portion 104.

The arithmetic control circuit portion 104 includes a display element control circuit 106, an arithmetic circuit 108, and a sensor control circuit 110.

The display portion 102 includes a pixel circuit 112, a display element driver circuit 114, and a sensor driver circuit 116.

The display element control circuit 106 has a function of generating a signal for controlling the display element driver circuit 114 using a signal transmitted from the arithmetic circuit 108 and supplying the signal to the display element driver circuit 114.

The arithmetic circuit 108 has a function of generating a control signal which is supplied to the display element driver circuit 114 and a function of generating a control signal which is supplied to the sensor driver circuit 116 using data acquired from the sensor control circuit 110. Specifically, the arithmetic circuit 108 has a function of generating a signal for displaying an image which should be displayed on the display portion 102 and a function of generating a control signal for setting detection time or the like for optimizing detection sensitivity of a sensor. Further, the arithmetic circuit 108 has a function of generating image display data which is supplied to the display element control circuit 106 using data acquired from the sensor control circuit 110. Note that a memory circuit used for the arithmetic circuit 108 or the like may be provided in the arithmetic circuit 108 or may be provided as a different circuit. In this embodiment, the memory circuit is a circuit used for storing data and includes a read only memory (ROM) in which a computer program, a filter for image processing, a lookup table, and the like running on the arithmetic circuit 108 are stored; a random access memory (RAM) in which an arithmetic result operated by the arithmetic circuit 108, image data, and the like are stored; or the like.

The sensor control circuit 110 has a function of generating a signal for controlling the sensor driver circuit 116 and supplying the signal to the sensor driver circuit 116, and a function of processing a signal acquired from the sensor. Specifically, the sensor control circuit 110 has a function of generating a timing signal, a pulse width control signal, and the like using a signal transmitted from the arithmetic circuit 108 and supplying the signal to the sensor driver circuit 116. In addition, the sensor control circuit 110 has a function of encoding (analog to digital conversion of) a signal acquired from the sensor driver circuit 116 and generating data which is transmitted to the arithmetic circuit 108.

The display element driver circuit 114 includes a scan line display element driver circuit 118 and a signal line display element driver circuit 120, and controls display elements in the pixel circuit 112.

The scan line display element driver circuit 118 has a function of applying a high potential to only gate electrodes of the display elements in a specific row. The high potential here means a potential which is greater than or equal to a potential which can turn on a thin film transistor provided in the display element.

The signal line display element driver circuit 120 has a function of applying a given potential to only electrodes connected to source wirings of the display elements in a specific column. The given potential here means a potential necessary for desired display by the display elements.

In a display element having a thin film transistor in which a high potential is applied to a gate electrode by the scan line display element driver circuit 118, the thin film transistor is turned on, and current corresponding to the potential of the signal line display element driver circuit 120 flows or voltage is applied, whereby desired display can be performed.

The sensor driver circuit 116 includes a scan line sensor driver circuit 122 and a sensor output signal acquiring circuit 124.

The scan line sensor driver circuit 122 has a function of applying a high potential to only gate electrodes of thin film transistors connected to sensors in a specific row. The high potential here means a potential which is greater than or equal to a potential which can turn on a thin film transistor provided for a sensor.

The sensor output signal acquiring circuit 124 has a function of acquiring output signals of the sensors in a specific column.

The pixel circuit 112 includes a plurality of pixels, and each pixel is provided with a color filter layer, a light-emitting layer, and the like so as to emit any of colors of red (R), green (G), and blue (B).

In the case where the display portion 102 includes liquid crystal elements, color filter layers are generally provided on a counter substrate side; however, the present invention is not limited thereto. The color filter layers may also be provided at other appropriate positions. That is, the color filter layers may be provided by a color filter on array (COA) method. Furthermore, in the case where light-emitting diodes of R, G, and B are provided as backlights (that is, in the case of a field sequential method), color filter layers are not always necessary.

In the case where the display portion 102 includes light-emitting elements, light-emitting layers for R, G, and B are provided.

Figure 2A:
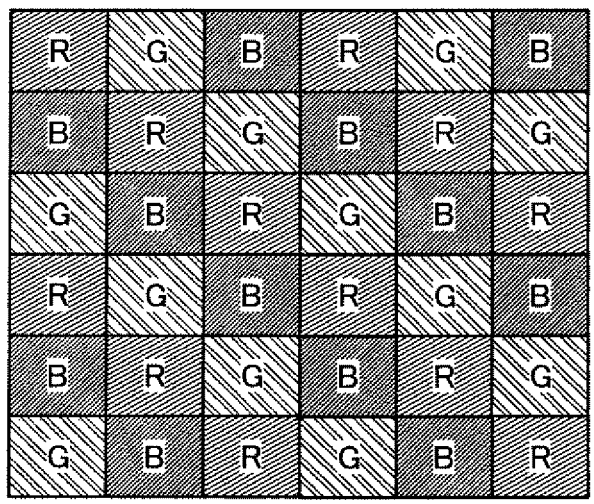
FIGS. 2A to 2C each illustrate color arrangement of a touch panel.
Figure 2B:
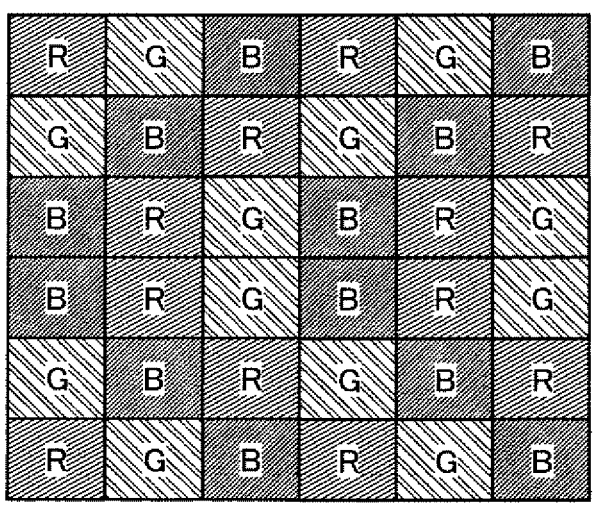
Figure 2C:
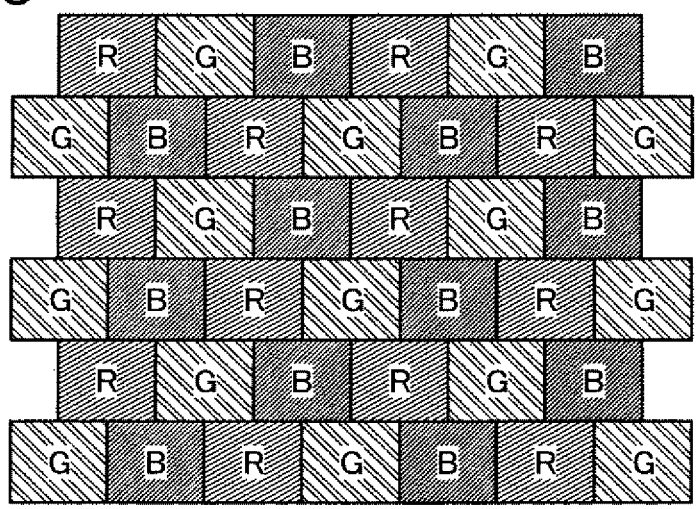

When a touch panel which is one embodiment of the present invention is formed using liquid crystal elements, an object to be detected has a color similar to one of red (R), green (G), and blue (B), and the object to be detected has a stripe pattern, there is a problem in that detection sensitivity is drastically lowered when color filters of the same color are provided in the same straight line. In order to solve this problem, color filters of the same color are not provided in the same straight line but provided at positions shifted from each other. FIGS. 2A to 2C each illustrate an example of arrangement of colors of the color filters provided for the touch panel which is one embodiment of the present invention. FIG. 2A illustrates arrangement called mosaic arrangement. FIG. 2B illustrates arrangement in which color filters of the same color are arranged by being shifted one by one obliquely and such arrangement is inverted at a certain interval. FIG. 2C illustrates arrangement called delta arrangement. Here, the delta arrangement as illustrated in FIG. 2C is most preferable because non-uniformity in arrangement of color filters of each color is small. Note that the arrangement of the color filters is not limited to those in FIGS. 2A to 2C. The same can also apply to the arrangement of light-emitting layers.

Figure 3A:
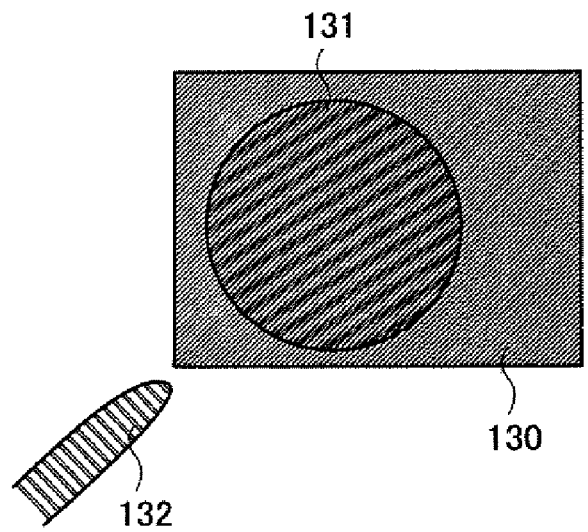
FIGS. 3A to 3C each illustrate an operation of a touch panel.
Figure 3B:
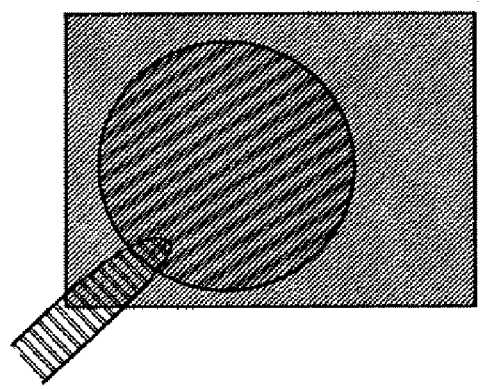
Figure 3C:
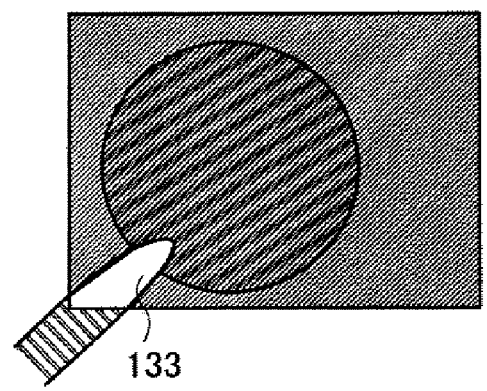

The following will describe an operation of the touch panel which is one embodiment of the present invention, in which, in a state where a circle is displayed on a display portion of the touch panel as illustrated in FIGS. 3A to 3C, an object to be detected approaches or is in contact with a left lower portion of the circle.

FIG. 3A illustrates a state in which a circle 131 is displayed on a display portion 130 and an object 132 to be detected does not approach or is not in contact with the display portion 130. The display portion 130 in FIG. 3A corresponds to the display portion 102 where the pixel circuit 112 is provided as illustrated in FIG. 1.

FIG. 3B illustrates a state in which the object 132 to be detected is arranged directly above the display portion 130 but does not approach or is not in contact with the display portion 130. The display portion 130 and the object 132 to be detected have a sufficient distance therebetween so that the object 132 to be detected is not detected.

Figure 4:
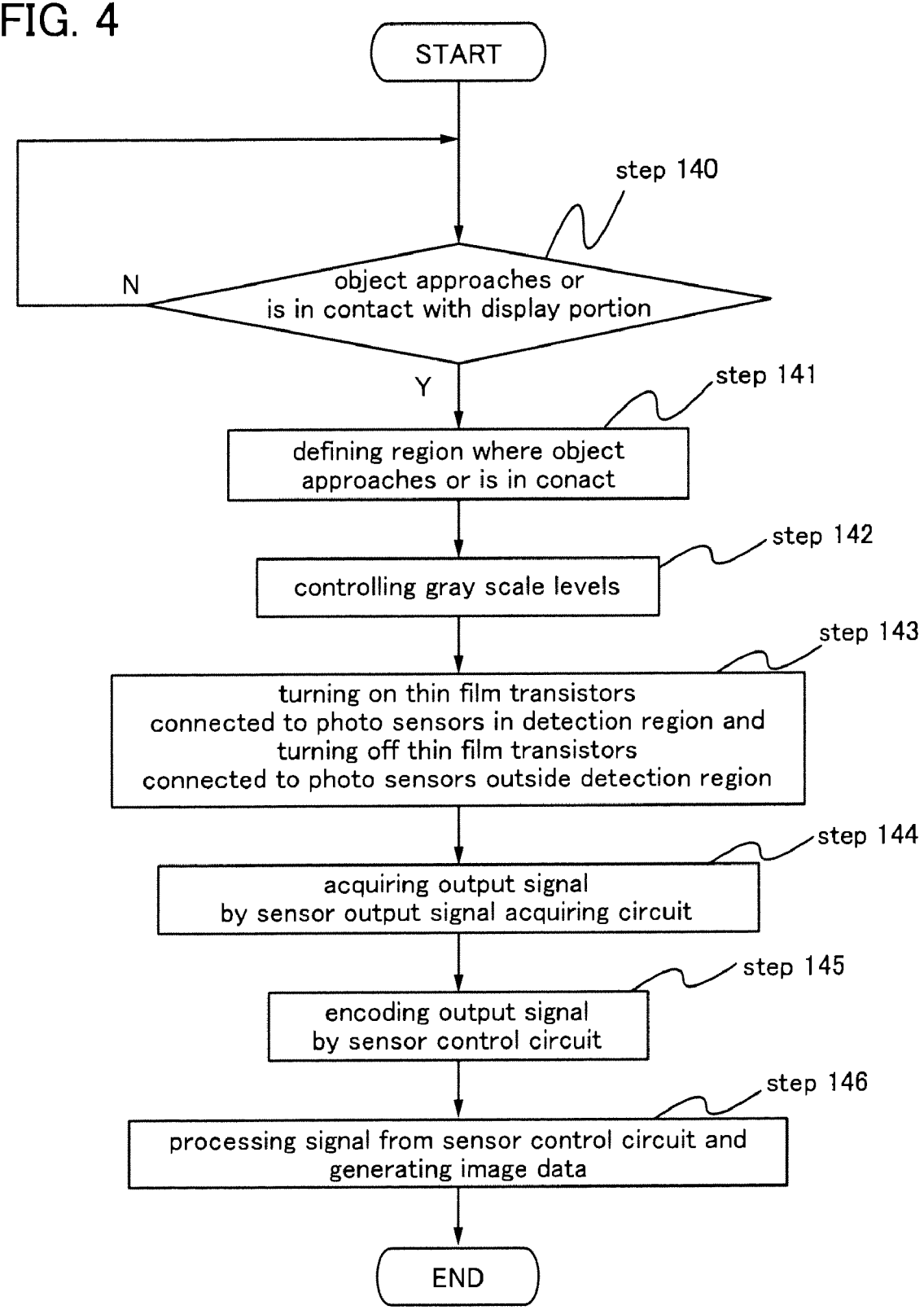
FIG. 4 is a flow chart of an operation of a touch panel.

FIG. 3C illustrates a state in which the object 132 to be detected approaches or is in contact with a left lower portion of the circle 131 which is displayed on the display portion 130. By detecting the object 132 to be detected, a detection region is determined, and gray scale levels are controlled in the detection region so that the intensity of light per unit area and unit time can be substantially uniform. This operation will be described with reference to FIG. 4.

When the object 132 to be detected approaches or is in contact with the display portion as illustrated in FIG. 3C, the approach or the contact of the object 132 to be detected is detected. The touch panel judges whether the object 132 to be detected approaches or is in contact with the display portion 130 or not (Step 140). This judgment operation may be performed with a certain cycle. For example, the judgment operation may be performed every 1/60 second. The judgment operation may be performed in such a manner that signals are sequentially supplied from the scan line sensor driver circuit 122 to gates of all the thin film transistors connected to photo sensors in the pixel circuit 112, and a current value of the signal line of each column is detected row by row (every scan line) by the sensor output signal acquiring circuit 124.

When the object 132 to be detected approaches or is in contact with the display portion 130 of the touch panel, the photo sensor provided in the pixel circuit 112 detects the approach or the contact of the object 132 to be detected, and a region where the object 132 to be detected approaches or is in contact (a detection region 133) is defined (Step 141). That is, when the object 132 to be detected approaches or is in contact with the display portion 130 of the touch panel, the photo sensor in the detection region 133 is irradiated with reflected light (light which is emitted from a backlight or the like and reflected by the object 132 to be detected). When this photo sensor is irradiated with reflected light whose intensity is greater than or equal to the threshold value (or higher than the threshold value), it is detected that the object 132 to be detected approaches or is in contact, and a region irradiated with reflected light whose intensity is greater than or equal to the threshold value (or higher than the threshold value) is defined as the detection region 133. Here, since the thin film transistors connected to the photo sensors in the pixel circuit 112 are sequentially turned on row by row, by measuring the current value of the signal line to which the thin film transistor is connected and detecting whether the current value is greater than or equal to the current value which is obtained when the reflected light intensity is greater than or equal to the threshold value, it can be detected whether the intensity of the reflected light is greater than or equal to the threshold value.

When only the case where the object 132 to be detected is in contact with the surface of the display portion 130 of the touch panel is detected, it is difficult in some cases to detect whether the object 132 to be detected approaches or is in contact with the surface of the display portion 130 of the touch panel just by reflected light of light from a backlight or the like. Thus, when only the case where the object 132 to be detected is in contact with the surface of the display portion 130 of the touch panel is detected, a light guide plate may be provided between the photo sensor of the display portion 130 and the surface of the display portion 130 so that light may be emitted in a direction approximately parallel with the surface of the display portion 130 so as to cause total reflection, whereby a region where the object 132 to be detected is in contact may be detected.

Then, right after the detection region 133 is defined, gray scale levels are controlled so that the intensity of light in the detection region per unit area and unit time is substantially uniform (Step 142). At this time, gray scale levels of the pixels in the detection region 133 are set to be uniform. In addition, gates of all the thin film transistors connected to the photo sensors in the detection region 133 are set to have a high potential, so that the thin film transistors are turned on. At this time, the thin film transistors which are connected to the photo sensors which are provided in the display portion 130 but outside the detection region 133 are all turned off (Step 143).

When using a liquid crystal element, the gray scale levels of the detection region 133 may be controlled (the intensity of light emitted from the detection region 133 per unit area and unit time may be controlled) by controlling the transmittance of the pixels or the brightness (luminance) of a backlight. The transmittance of the pixels may be controlled by controlling voltage between a pixel electrode and a counter electrode. Also, in a light-emitting display device, the transmittance of the pixels may be controlled by controlling voltage applied between two electrodes which sandwich a light-emitting element. In order to control the gray scale levels of the detection region 133 to be uniform, video signals are set to be uniform. Alternatively, when the light-emitting display device employs a time ratio gray scale method, the intensity of light per unit area and unit time may be controlled by controlling light-emitting time.

Here, video signals for the pixels in the detection region which are adjusted to be uniform are preferably equal to a video signal with which the intensity of light in the detection region per unit area and unit time before Step 141 has the maximum value, more preferably, white display is performed in the detection region. This is because by increasing the intensity of light of the pixels per unit area and unit time as much as possible, the object to be detected is irradiated with high-intensity light, and thus, the intensity of reflected light from the object to be detected is also increased, whereby the maximum value of light which is detected is increased and the resolution is improved. In particular, spatial resolution is improved. In the case where the intensity of light of the pixels in the detection region per unit area and unit time is set to be the maximum value before Step 141, the intensity of light emitted from the detection region can be uniform without increasing the power consumption of the backlight.

Then, light which is adjusted to have the same gray scale levels with respect to the object 132 to be detected is emitted from the detection region 133. Part of the emitted light is reflected by the surface of the object 132 to be detected, and the reflected light is detected by a photo sensor provided in the pixel. Specifically, the photo sensor is irradiated with the reflected light, thereby causing photovoltaic effect. Current flows from a source to a drain of the thin film transistor which is connected to the photo sensor and turned on, and an output signal is acquired by the sensor output signal acquiring circuit 124 through each signal line (Step 144).

The output signal acquired by the sensor output signal acquiring circuit 124 is encoded (converted from analog to digital) by the sensor control circuit 110 (Step 145) and transmitted to the arithmetic circuit 108. The arithmetic circuit 108 processes the signal supplied from the sensor control circuit 110 and generates image data (Step 146). After that, the touch panel judges whether the object 132 to be detected approaches or is in contact with the display portion 130 again (Step 140). Alternatively, the operation of Step 140 may also be performed during operations of Steps 141 to 146.

Light with the same hue is emitted from the touch panel, in which the gray scale levels of the detection region 133 are adjusted as described above, to the object 132 to be detected, part of the emitted light is reflected by the object 132 to be detected, and the reflected light enters the photo sensor provided in the display portion 130. Accordingly, the intensity of the reflected light which is detected is determined based on the three-dimensional shape of the object to be detected. That is, with the use of the reflected light, spatial resolution is improved.

The case where the intensity of light emitted from the detection region is not uniform and the photo sensor detects the reflected light is considered. Since the reflected light used for detection passes through a liquid crystal layer after being reflected, the reflected light depends on a displayed image. Therefore, when the intensity of light emitted from the detection region is not made to be uniform and the reflected light is detected, a signal detected by the photo sensor depends on the displayed image, and it is difficult to accurately read the object to be detected. One embodiment of the present invention can solve such a problem.

As described above, the touch panel which is one embodiment of the present invention can be a non-contact type touch panel. The touch panel which is one embodiment of the present invention is also effective for the non-contact type touch panel since the intensity of light of the detection region per unit area and unit time is large.

EXAMPLE 1

Figure 5:
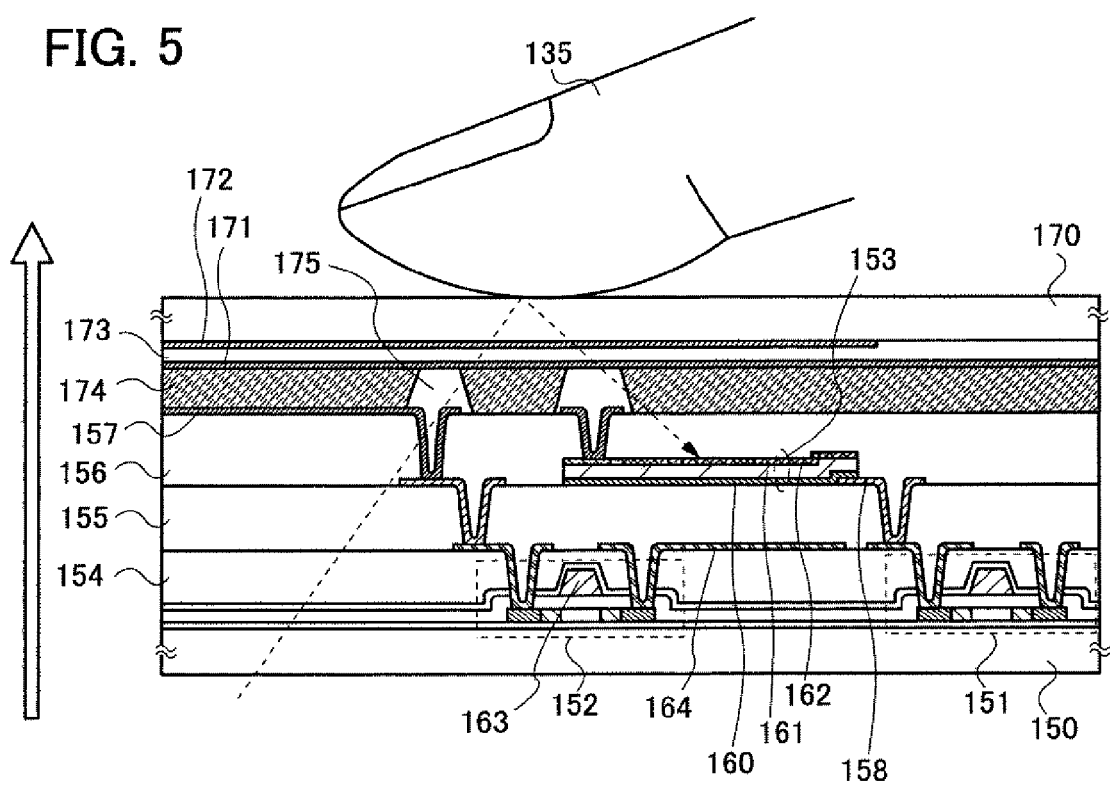
FIG. 5 is a cross-sectional view of a touch panel including a liquid crystal element.

In this example, an example of a touch panel including a liquid crystal element will be described with reference to FIG. 5 as one preferable mode of the touch panel. FIG. 5 is a cross-sectional view in a state in which a finger 135 as an object to be detected is in contact with a display portion of a touch panel.

As a substrate 150, a light-transmitting substrate such as a glass substrate or a quartz substrate is used. Over the substrate 150, at least a thin film transistor 151, a thin film transistor 152, and a photo sensor 153 are provided. The thin film transistor 151 is connected to the photo sensor 153, and the thin film transistor 152 is connected to a liquid crystal element. The photo sensor 153 is formed by a stack of an n-type semiconductor layer 160, an i-type semiconductor layer 161, and a p-type semiconductor layer 162. The n-type semiconductor layer 160 contains an impurity element imparting n-type conductivity (e.g., phosphorus). The i-type semiconductor layer 161 is an intrinsic semiconductor. The p-type semiconductor layer 162 contains an impurity element imparting p-type conductivity (e.g., boron).

In FIG. 5, top gate thin film transistors are used as the thin film transistors 151 and 152, but the present invention is not limited thereto, and a bottom gate thin film transistor may also be used. In addition, polycrystalline silicon is used for semiconductor layers of the thin film transistors 151 and 152, but the present invention is not limited thereto. The semiconductor layers of the thin film transistors 151 and 152 may be formed using amorphous silicon, single crystal silicon, an organic semiconductor such as pentacene, a transparent amorphous oxide semiconductor (TAOS), or the like. In order to form single crystal silicon over the substrate 150, the substrate 150 is bonded to a single crystal silicon substrate in which a damaged region is provided at a predetermined depth from the surface, and the single crystal silicon substrate is separated at the damaged region.

An insulating layer 154 is provided over and to cover the thin film transistors 151 and 152. An insulating layer 155 is provided over the insulating layer 154, and an insulating layer 156 is provided over the insulating layer 155. A pixel electrode 157 is provided over the insulating layer 156, and the photo sensor 153 is provided over the insulating layer 155. The photo sensor 153 is electrically connected to the thin film transistor 151 using a lower electrode 158 through an opening provided in the insulating layer 155.

In addition, a counter substrate 170 is provided with a counter electrode 171, a color filter layer 172, and an overcoat layer 173. The counter substrate 170 and the substrate 150 are attached to each other with a sealant, and a substantially even space between the substrates is kept by a spacer 175. The pixel electrode 157 and the counter electrode 171 sandwich a liquid crystal layer 174, whereby a liquid crystal element is formed.

The color filter layer 172 is preferably provided in any of the arrangements illustrated in FIGS. 2A to 2C as described in the embodiment. The delta arrangement illustrated in FIG. 2C is most preferable. The delta arrangement is employed for the arrangement of color filters, whereby non-uniformity of colors can be reduced.

The color filter layer 172 may be provided so as to overlap with both the photo sensor 153 and the pixel electrode 157 as illustrated in FIG. 5.

The photo sensor 153 overlaps with a gate electrode 163 of the thin film transistor 152 as illustrated in FIG. 5 and is preferably provided so as to overlap with also a signal line 164 of the thin film transistor 152.

A backlight is provided in the liquid crystal display device. In FIG. 5, the backlight is provided on the substrate 150 side, and light is emitted in a direction indicated by an outline arrow. As the backlight, a cold-cathode fluorescent lamp or a white light-emitting diode can be used. A white light-emitting diode is preferable because the adjustable range of brightness is wider than that of a cold-cathode fluorescent lamp.

For example, the photo sensor 153 can also be provided in a driver circuit portion to detect outside light, whereby the brightness (luminance) of the backlight can be adjusted so as to enable display appropriate for the circumstance where the touch panel is used.

As a most preferable mode, the case of using a cold-cathode fluorescent lamp or a white light-emitting diode as the backlight of the liquid crystal display device is described in this example. When a cold-cathode fluorescent lamp or a white light-emitting diode is used as the backlight of the liquid crystal display device, the intensity of light emitted from the detection region can be uniform without increasing the power consumption of the backlight.

However, the present invention is not limited thereto. For example, light-emitting diodes of three different colors of red (R), green (G), and blue (B) may be used to form a backlight, and thereby a field sequential method may be employed. A color filter layer is not necessary in that case.

Now, an example of a method for manufacturing the touch panel including a liquid crystal element illustrated in FIG. 5 will be briefly described.

First, top gate thin film transistors each including a crystalline semiconductor layer are formed. Here, the thin film transistor 152 including the gate electrode 163 and the thin film transistor 151 which is electrically connected to the photo sensor 153 are formed over one substrate. As each of the TFTs, an n-channel thin film transistor or a p-channel thin film transistor can be used, which is appropriately designed by a practitioner depending on a circuit to be used. Moreover, a storage capacitor in which the semiconductor layer serves as a lower electrode is formed in the same step as these TFTs. Note that in the storage capacitor, a capacitor wiring serves as an upper electrode, and a gate insulating layer of the thin film transistors 151 and 152 is used as a dielectric.

Contact holes are formed in the insulating layer 154 which is one of interlayer insulating layers of the thin film transistors, and a source electrode and a drain electrode which are electrically connected to the semiconductor layer of each of the thin film transistors or a connection electrode which is connected to an upper wiring is formed. Moreover, a signal line of the thin film transistor 151 which is electrically connected to the photo sensor is formed in the same step. Further, the signal line of the thin film transistor 152 is also formed in the same step.

Next, the insulating layer 155 which covers the signal line 164 is formed. Note that since an example of a transmissive liquid crystal display device is shown in this example, an insulating material through which visible light can pass is used for the insulating layer 155. Then, a contact hole is formed in the insulating layer 155, and the lower electrode 158 is formed over the insulating layer 155.

Then, the photo sensor 153 is formed so as to overlap with at least part of the lower electrode 158. The lower electrode 158 is an electrode for electrically connecting the photo sensor 153 and the thin film transistor 151. The photo sensor 153 is formed by a stack of the n-type semiconductor layer 160, the i-type semiconductor layer 161, and the p-type semiconductor layer 162. In this example, microcrystalline silicon containing phosphorus, amorphous silicon, and microcrystalline silicon containing boron are stacked as the n-type semiconductor layer 160, the i-type semiconductor layer 161, and the p-type semiconductor layer 162 respectively by a plasma CVD method.

Next, the insulating layer 156 which covers the photo sensor 153 is formed. The insulating layer 156 is also formed using an insulating material through which visible light can pass. Then, a contact hole is formed in the insulating layer 156, and the pixel electrode 157 is formed over the insulating layer 156. The upper electrode of the photo sensor 153 may also be formed using the same layer as the pixel electrode 157.

Next, a post spacer (a columnar spacer) is formed over the insulating layer 156. Note that a bead spacer (a spherical spacer) may be used instead of the columnar spacer.

Then, when a TN liquid crystal or the like is used, an alignment film is formed over the pixel electrode 157 by coating, and rubbing treatment is performed.

Meanwhile, the color filter layer 172, the overcoat layer 173, and the counter electrode 171 are formed over the counter substrate 170. An alignment film is formed over the counter electrode 171 by coating, and rubbing treatment is performed.

After that, a surface of the substrate 150, over which the alignment film is formed by coating, and a surface of the counter substrate 170, over which the alignment film is formed by coating, are attached to each other with a sealant. A liquid crystal is placed between these substrates by a liquid crystal dripping method or a liquid crystal injection method, whereby the liquid crystal layer 174 is formed.

Alternatively, a blue-phase liquid crystal for which an alignment film is not necessary may be used for the liquid crystal layer 174. The blue phase is a kind of liquid crystal phase and appears just before phase transition from a cholesteric phase to an isotropic phase when the temperature of a cholesteric liquid crystal is increased. Since the blue phase appears only in a narrow temperature range, a liquid crystal composition in which 5 wt. % or more of a chiral material is mixed is used for the liquid crystal layer 174 in order to broaden the temperature range. As for the liquid crystal composition which contains a blue-phase liquid crystal and a chiral material, the response speed is as high as 10 µs to 100 µs, alignment treatment is not necessary due to optical isotropy, and viewing angle dependence is low.

In the liquid crystal display device, if one frame period is a cycle for processing sensing data, one position which is touched is detected or fingerprint data is detected within approximately 1/60 second. Note that a display period for one screen is referred to as one frame period, and one frame period corresponding to one time axis is divided to produce a plurality of sub-frame periods. When one frame period is divided into two sub-frame periods, a sub-frame period is half of one frame period (i.e., 1/120 second). In the liquid crystal display device, for example, an image signal is input to pixels once to perform display in one sub-frame period of the two sub-frame periods, and a reset signal is supplied to instantaneously perform white display on the entire screen in the other sub-frame period. In that case, the human eye cannot recognize change of the gray scale levels in one sub-frame period. Thus, for the human eye, the gray scale level by the image signal and white display on the entire screen are combined, and the gray scale level in one frame period is higher than the gray scale level by the image signal. Therefore, it is preferable to compensate the image signal to obtain a desired gray scale level even when the gray scale level by the image signal and white display on the entire screen are combined.

In addition, preferably, a circuit for converting an analog signal to a digital signal is provided in the sensor control circuit, whereby the sensor control circuit has a mode in which output voltage is saturated at low illuminance. With the mode in which output voltage is saturated at low illuminance, resolution in a low-illuminance region is particularly increased, so that output voltage can be increased and the dynamic range can be widened.

Note that the touch panel which is one embodiment of the present invention is not only used for the liquid crystal display device but also for a light-emitting device typified by an EL display device.

EXAMPLE 2

In this example, an electronic device to which the touch panel described in the above embodiment and example is applied and an application of the electronic device will be described.

Figure 6A:
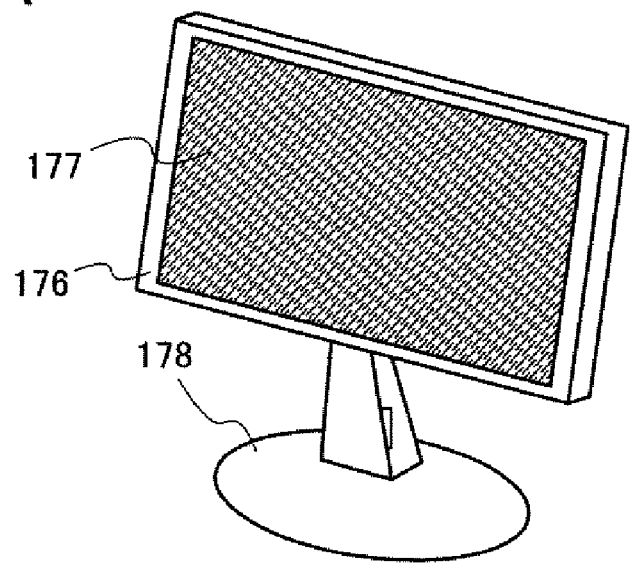
FIGS. 6A and 6B each illustrate an electronic device to which a touch panel is applied.

FIG. 6A illustrates a monitor type touch panel which is one embodiment of the present invention. The monitor type touch panel illustrated in FIG. 6A includes a chassis 176, a display portion 177, a support 178, and the like. The touch panel which is one embodiment of the present invention is incorporated in the chassis 176, and a photo sensor is provided in a pixel of the display portion 177. The display portion 177 has a display function and an information input function. With the use of the touch panel which is one embodiment of the present invention, high-sensitivity detection can be performed, thereby obtaining a monitor type touch panel with high accuracy in reading.

Figure 6B:
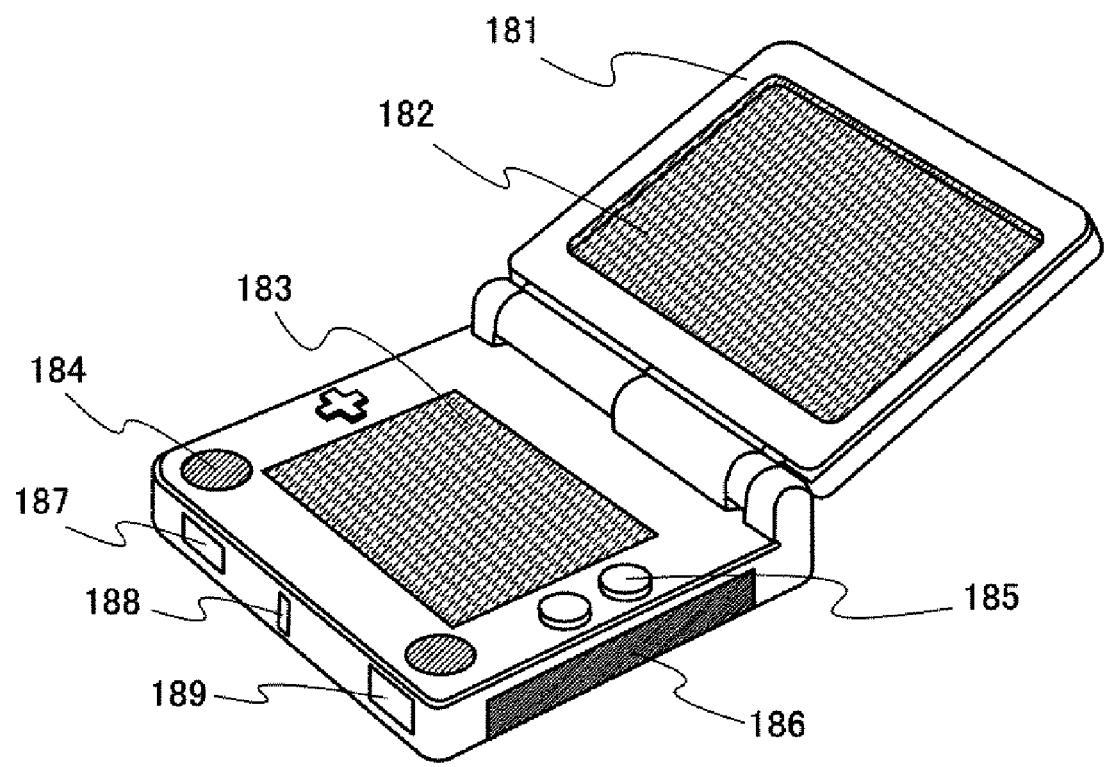

FIG. 6B illustrates a portable game machine to which the touch panel which is one embodiment of the present invention is applied. The portable game machine illustrated in FIG. 6B includes a chassis 181, a first display portion 182, a second display portion 183, speaker portions 184, operation keys 185, a storage medium insertion portion 186, an input means 187, an LED lamp 188, and a microphone 189. The portable game machine illustrated in FIG. 6B has a function of reading out a program or data stored in a storage medium and displaying an image on the first and second display portions 182 and 183, and can share information with another portable game machine by wireless communication. The touch panel which is one embodiment of the present invention is used for one or both of the first display portion 182 and the second display portions 183, whereby high-sensitivity detection is possible. Therefore, a game machine having a touch panel with high accuracy in reading can be obtained. Accordingly, security can be improved and a game which is more complicated and sophisticated than the conventional one can be provided.

Figure 7A:
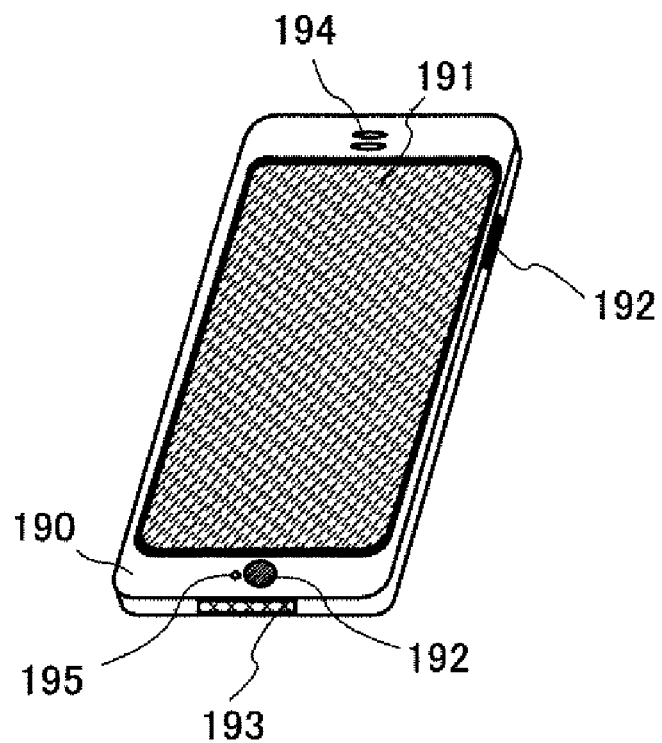
FIGS. 7A and 7B each illustrate an electronic device to which a touch panel is applied.
Figure 7B:
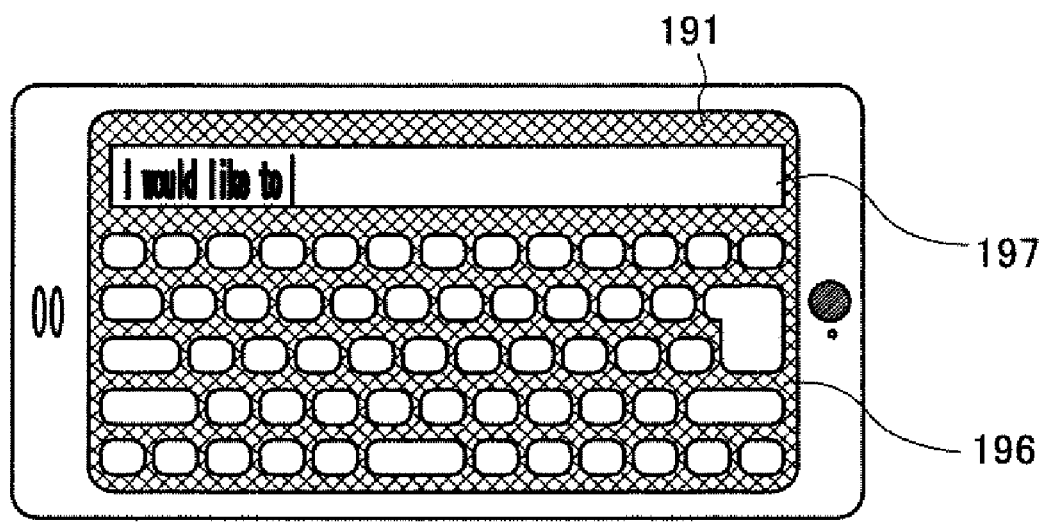

FIGS. 7A and 7B illustrate a mobile phone (a so-called smartphone) to which the touch panel which is one embodiment of the present invention is applied. A chassis 190 of the mobile phone illustrated in FIGS. 7A and 7B includes a display portion 191, an operation button 192, an external connection port 193, a speaker 194, and a microphone 195. By touching the display portion 191 with a finger or the like, information can be input to the mobile phone.

There are mainly three screen modes for the display portion 191. The first mode is a display mode mainly for displaying an image. The second mode is an input mode mainly for inputting data such as text. The third mode is a display-and-input mode in which two modes of the display mode and the input mode are combined.

FIG. 7B is a front view of the mobile phone in the input mode. As illustrated in FIG. 7B, a keyboard 196 is displayed in the display portion 191. Letters input from the keyboard 196 are displayed on a screen 197. Since an input operation of letters precedes in the input mode, the keyboard 196 is displayed on most part of the screen in the display portion 191. Key arrangement of the keyboard 196 is changed depending on a language to be used.

When a sensor for detecting inclination, such as an acceleration sensor, is provided inside the mobile phone illustrated in FIGS. 7A and 7B, display on the screen in the display portion 191 can be automatically switched by determining the orientation of the mobile phone (whether the mobile phone is placed horizontally or vertically for a landscape mode or a portrait mode).

Further, the screen modes are switched by approach or contact to/with the display portion 191 (touch operation) or operation of the operation button 192. Alternatively, the screen modes can be switched depending on kinds of images displayed on the display portion 191. For example, when a signal for an image displayed on the display portion 191 is data of moving images, the screen mode can be switched to the display mode, and when the signal is text data, the screen mode can be switched to the input mode.

Moreover, in the input mode, when a signal detected by a photo sensor in the display portion 191 is judged and input by touching the display portion 191 is not performed for a certain period of time, the screen mode may be switched from the input mode to the display mode.

The display portion 191 is a display portion of a touch panel as described in the above embodiment. For example, an image of a palm print, a fingerprint, or the like is taken by touching the display portion 191 with a palm, a finger, or the like, whereby personal authentication can be performed. Further, by providing a backlight or a sensing light source emitting near-infrared light for the display portion, an image of a finger vein, a palm vein, or the like can be taken. Since high-sensitivity detection can be performed by applying the touch panel which is one embodiment of the present invention, a mobile phone including a touch panel with high accuracy in reading can be obtained. Therefore, by registering a finger print of a user for example, a mobile phone with high security which can be used only by a user whose finger print is registered can be obtained.

As described above, an electronic device including a display portion having the above effect can be obtained.

This application is based on Japanese Patent Application serial no. 2008-257767 filed with Japan Patent Office on Oct. 2, 2008, the entire contents of which are hereby incorporated by reference.

What is claimed is:

1. A method for driving a touch panel which is provided with photo sensors in pixels, comprising the steps of:
   displaying an image in a display device comprising a plurality of pixels;
   determining a detection region by detecting light reflected by an object to be detected in a state in which the image is displayed;
   turning on transistors connected to the photo sensors which are provided in the detection region;
   turning off transistors connected to the photo sensors which are provided outside the detection region; and
   reading the object to be detected while equalizing gray scale levels of pixels in the detection region, turning on the transistors connected to the photo sensors which are provided in the detection region, and turning off the transistors connected to the photo sensors which are provided outside the detection region.

2. The method for driving a touch panel according to claim 1, wherein video signals supplied to the pixels in the detection region while the reading is performed are equal to each other.

3. A touch panel operated by the method for driving a touch panel according to claim 1.

4. The touch panel according to claim 3, wherein the plurality of pixels emitting same color are provided at positions shifted from each other.

5. The touch panel according to claim 3, wherein the plurality of pixels are arranged in delta arrangement.

6. The touch panel according to claim 3, wherein the display device is a liquid crystal display device.

7. The touch panel according to claim 6, wherein a cold-cathode fluorescent lamp is used as a backlight of the liquid crystal display device.

8. The touch panel according to claim 6, wherein a white light-emitting diode is used as a backlight of the liquid crystal display device.

9. The touch panel according to claim 6, wherein a liquid crystal layer of the liquid crystal display device includes a liquid crystal which exhibits a blue phase.

10. The method for driving a touch panel according to claim 1, wherein the detection region is determined as a region in which the photo sensors are irradiated with the light whose intensity is greater than or equal to a threshold value of the photo sensors.

11. A method for driving a touch panel which is provided with photo sensors in pixels, comprising the steps of:
    displaying an image in a display device comprising a plurality of pixels;
    determining a detection region by detecting light reflected by an object to be detected in a state in which the image is displayed;
    turning on transistors connected to the photo sensors which are provided in the detection region;
    turning off transistors connected to the photo sensors which are provided outside the detection region; and
    reading the object to be detected while equalizing gray scale levels of pixels in the detection region to a gray scale level of the brightest pixel among the pixels in the detection region, turning on the transistors connected to the photo sensors which are provided in the detection region, and turning off the transistors connected to the photo sensors which are provided outside the detection region.

12. The method for driving a touch panel according to claim 11, wherein video signals supplied to the pixels in the detection region while the reading is performed are equal to each other.

13. A touch panel operated by the method for driving a touch panel according to claim 11.

14. The touch panel according to claim 13, wherein the plurality of pixels emitting same color are provided at positions shifted from each other.

15. The touch panel according to claim 13, wherein the plurality of pixels are arranged in delta arrangement.

16. The touch panel according to claim 13, wherein the display device is a liquid crystal display device.

17. The touch panel according to claim 16, wherein a cold-cathode fluorescent lamp is used as a backlight of the liquid crystal display device.

18. The touch panel according to claim 16, wherein a white light-emitting diode is used as a backlight of the liquid crystal display device.

19. The touch panel according to claim 16, wherein a liquid crystal layer of the liquid crystal display device includes a liquid crystal which exhibits a blue phase.

20. The method for driving a touch panel according to claim 11, wherein the detection region is determined as a region in which the photo sensors are irradiated with the light whose intensity is greater than or equal to a threshold value of the photo sensors.

21. A method for driving a touch panel which is provided with photo sensors in pixels, comprising the steps of:
    displaying an image in a display device comprising a plurality of pixels;
    determining a detection region by detecting light reflected by an object to be detected in a state in which the image is displayed;
    turning on transistors connected to the photo sensors which are provided in the detection region;
    turning off transistors connected to the photo sensors which are provided outside the detection region and
    reading the object to be detected while performing white display in the detection region, turning on the transistors connected to the photo sensors which are provided in the detection region, and turning off the transistors connected to the photo sensors which are provided outside the detection region.

22. The method for driving a touch panel according to claim 21, wherein video signals supplied to pixels in the detection region while the reading is performed are equal to each other.

23. A touch panel operated by the method for driving a touch panel according to claim 21.

24. The touch panel according to claim 23, wherein the plurality of pixels emitting same color are provided at positions shifted from each other.

25. The touch panel according to claim 23, wherein the plurality of pixels are arranged in delta arrangement.

26. The touch panel according to claim 23, wherein the display device is a liquid crystal display device.

27. The touch panel according to claim 26, wherein a cold-cathode fluorescent lamp is used as a backlight of the liquid crystal display device.

28. The touch panel according to claim 26, wherein a white light-emitting diode is used as a backlight of the liquid crystal display device.

29. The touch panel according to claim 26, wherein a liquid crystal layer of the liquid crystal display device includes a liquid crystal which exhibits a blue phase.

30. The method for driving a touch panel according to claim 21, wherein the detection region is determined as a region in which the photo sensors are irradiated with the light whose intensity is greater than or equal to a threshold value of the photo sensors.

* * * * *